H. D. DUNBAR.
PISTON FOR STEAM ENGINES.
No. 29,576. Patented Aug. 14, 1860.
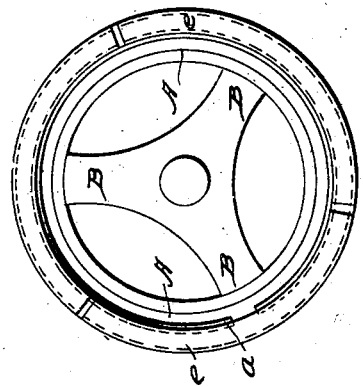
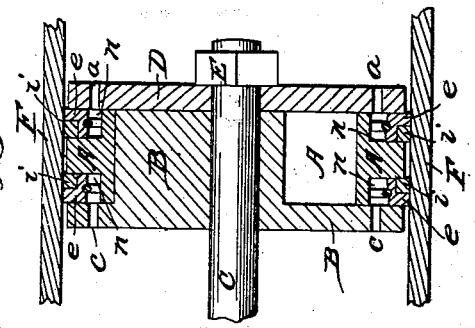
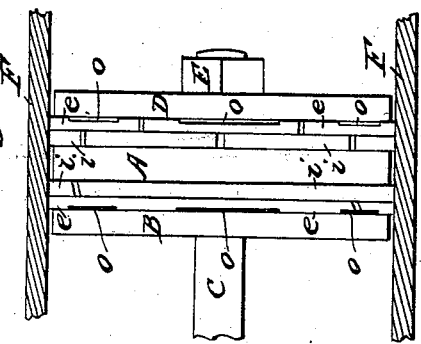
Witnesses:
Inventor
Henry D. Dunbar
per Atty A. B. Stoughton

UNITED STATES PATENT OFFICE.

HENRY D. DUNBAR, OF MEMPHIS, TENNESSEE.

PISTON FOR STEAM-ENGINES.

Specification forming part of Letters Patent No. 29,576, dated August 14, 1860; Reissued July 18, 1865, No. 2,029.

*To all whom it may concern:*

Be it known that I, HENRY D. DUNBAR, of Memphis, in the county of Shelby and State of Tennessee, have invented certain new and useful Improvements in Steam-Piston Heads and Their Packing; and I do hereby declare the following to be a full, clear, and exact description of the construction and operation of the same, reference being had to the accompanying drawings, making a part of this specification, in which—

Figure 1, represents, a view of the piston head, and rod, and the cylinder in section. Fig. 2, represents a section through the cylinder and piston head both. Fig. 3, represents an end view of the piston head with the end plate removed to show its interior.

Similar letters of reference where they occur in the several figures denote like parts in all the drawings.

Segmental packing rings have heretofore been used on piston heads; and the packing has been held out against the cylinder by steam and by springs, but no provision has been made to entirely prevent the steam from passing through beyond the packing, so far as I can learn. My object is to pack the joints closely by segmental rings, held out by steam, but without undue friction, and without cutting the piston head ring or rather by making it solid. And my invention consists in combining with a solid ring—the segmental packing rings, breaking joints with each other, and one fitting into the angle of the other, as will be explained in connection with the drawings accompanying this specification.

The piston head ring A, is made solid and may be supported by the three arms B, B, B, radiating from a common center, which forms a hub or support for the piston rod C, to pass through.

D, is a cap plate, that fits over the end of the piston head, being held thereto by the piston rod C, and its nut E; this cap has steam passages *a*, *a* &c. through it, to admit steam behind the packing rings at that end of the piston; and similar openings *c*, *c*, &c., are made through the other end of the piston head, to let the steam in behind the packing rings at that end.

The piston head ring A, is in one piece, and of a T shaped form, and sets over and is supported in its position by the arms B. The perimeter of this ring does not, or need not, work steam tight against the cylinder F, but in its angles are laid two rings *e*, *i* both of which are cut into segments so as to break joint with each other. The ring *e*, is made of an L, or angle-iron form, and the other ring *i* snugly fits into the angle of the ring *e*. Behind these rings I place a spring *n*, simply to hold the rings in place when the steam is shut off. It will be perceived that there are packing rings on both sides of the solid ring A so that there is double security against any steam getting behind the piston, by passing the packed joint.

I have represented one end of the piston head as cast with, or made a part of the hub and arms B. It may be made separate like that D, and be drawn and held up, by a shoulder on the piston rod, and the same nut E.

It is clearly seen in Fig. 2, how the steam gets in behind the packing rings to force them out against the cylinder F. It can also pass in behind the packing rings through the slots *o*, *o*, *o* &c. shown in Fig. 1.

The springs *n*, to the extent of their power whatever that may be, act to press outward the packing rings, but the main force is applied by the steam itself. In a locomotive on a descending grade, where the piston works by the momentum of the engine or its load—the steam being shut off, the springs alone hold out the packing rings.

Having thus fully described the nature and object of my invention what I claim in the construction of steam piston heads and their packing is—

In combination with the solid or uncut ring A, the segmental or cut rings *e*, *i* the latter fitting into the angle of the former and both breaking joint with each other, said rings *e*, *i*, being held out by the action of the steam in the cylinder mainly, to pack the piston, as herein represented.

HENRY D. DUNBAR

Witnesses:
E. COHEN,
I. HIRSCH.